United States Patent
Valiquette et al.

(10) Patent No.: US 12,508,657 B2
(45) Date of Patent: Dec. 30, 2025

(54) TOOL HOLDER AND A PARTING AND GROOVING TOOL FOR AN INDEXABLE TURRET, AND A MACHINING METHOD THEREFOR

(71) Applicant: AB SANDVIK COROMANT, Sandviken (SE)

(72) Inventors: Michael Valiquette, Sandviken (SE); Per-Olof Jansson, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 651 days.

(21) Appl. No.: 17/769,058

(22) PCT Filed: Jun. 16, 2020

(86) PCT No.: PCT/EP2020/066532
§ 371 (c)(1),
(2) Date: Apr. 14, 2022

(87) PCT Pub. No.: WO2021/078416
PCT Pub. Date: Apr. 29, 2021

(65) Prior Publication Data
US 2024/0100608 A1    Mar. 28, 2024

(30) Foreign Application Priority Data
Oct. 23, 2019    (EP) ..................... 19204738

(51) Int. Cl.
*B23B 29/04*    (2006.01)
*B23B 29/08*    (2006.01)
*B23B 29/20*    (2006.01)

(52) U.S. Cl.
CPC ............ *B23B 29/046* (2013.01); *B23B 29/08* (2013.01); *B23B 29/20* (2013.01); *B23B 2260/004* (2013.01)

(58) Field of Classification Search
CPC ... B23B 29/046; B23B 29/043; B23B 29/205; B23B 29/20; B23B 29/06; B23B 29/08;
(Continued)

(56) References Cited

U.S. PATENT DOCUMENTS

| 3,815,928 A | 6/1974 | Komori |
| 4,018,112 A | 4/1977 | Heaton et al. |

(Continued)

FOREIGN PATENT DOCUMENTS

| CN | 104551035 A | * | 4/2015 |
| CN | 108480669 A | | 9/2018 |

(Continued)

OTHER PUBLICATIONS

English translation of CN 104551035 (Year: 2015).*

*Primary Examiner* — Alan Snyder
(74) *Attorney, Agent, or Firm* — Corinne R. Gorski (57) ABSTRACT

A tool holder and a parting and grooving tool for an indexable turret have a plurality of tool stations, The adjacent tool stations have a predetermined angular spacing. The tool holder includes a mounting portion and a projected portion, which are connected. The mounting portion has a flat surface extending in an interface plane and the projected portion has a recess for holding the parting and grooving tool. The parting and grooving tool includes a cutting portion and a clamping portion. The cutting portion includes a cutting edge and the clamping portion includes a rear end surface. The parting and grooving tool is mountable in the recess such that a distance from the interface plane to the rear end surface of the parting and grooving tool is greater than a distance from the interface plane to the cutting portion of the parting and grooving tool.

16 Claims, 5 Drawing Sheets

(58) Field of Classification Search
CPC ........ B23B 2210/025; B23B 2210/022; B23B 2210/08; B23B 29/242
See application file for complete search history.

(56) References Cited

U.S. PATENT DOCUMENTS

| | | |
|---|---|---|
| 5,720,090 A | 2/1998 | Dawson |
| 10,052,696 B2 | 8/2018 | Homola |
| 2005/0129471 A1 | 6/2005 | Englund |
| 2011/0023276 A1 | 2/2011 | Jansen |
| 2014/0126969 A1 | 5/2014 | Tornstrom |
| 2014/0133903 A1 | 5/2014 | Jansen |
| 2017/0197252 A1 | 7/2017 | Ishihara |
| 2019/0054543 A1* | 2/2019 | Kiso .................. B23B 27/1659 |
| 2019/0255670 A1* | 8/2019 | Fautz .................... B23Q 1/522 |

FOREIGN PATENT DOCUMENTS

| | | |
|---|---|---|
| EP | 2730356 A1 | 9/2016 |
| EP | 3246125 A1 | 11/2017 |
| EP | 3357613 A1 | 8/2018 |
| GB | 190914417 A * | 1/1910 |

\* cited by examiner

TOOL HOLDER AND A PARTING AND GROOVING TOOL FOR AN INDEXABLE TURRET, AND A MACHINING METHOD THEREFOR

RELATED APPLICATION DATA

This application is a § 371 National Stage Application of PCT International Application No. PCT/EP2020/066532 filed Jun. 16, 2020 with priority to EP 19204738.9 filed Oct. 23, 2019.

TECHNICAL FIELD OF THE INVENTION

The present invention belongs to the technical field of metal cutting. More specifically the present invention belongs to a tool holder and a parting and grooving tool for an indexable turret. In a further aspect, the present invention relates to a machining method.

BACKGROUND OF THE INVENTION AND PRIOR ART

The present invention relates to a tool holder and a parting and grooving tool for an indexable turret. Many modern CNC-machines or CNC-lathes comprise an indexable turret. Such turret comprise a plurality of tool stations. Normally, different types of cutting tools are connected directly or indirectly, e.g. by a clamping unit or tool holder, to said tool stations. When changing from one type of cutting tool to another, the turret rotates such that another cutting tool is positioned in an active position, i.e. is positioned towards a metal work piece to be machined.

U.S. Pat. No. 4,018,112A disclose a grooving tool for a turret. The grooving tool is connected to a tool station. The grooving depth is limited for the disclosed grooving tool.

The inventors have found that there is a need for parting and/or grooving at greater grooving depth for a CNC-machine equipped with one or more turrets.

SUMMARY OF THE INVENTION

It is an object of the invention to provide a tool holder and a parting and grooving tool which can perform a parting and grooving operation at relatively large depth for a CNC-lathe comprising a turret.

It is a further object to provide a tool holder and a parting and grooving tool for a CNC-lathe comprising a turret, which has a reduced risk of vibrations during cutting.

It is a still further object to provide a tool holder and a parting and grooving tool for a CNC-lathe comprising a turret, which is relatively small and light, and/or which does not extend further than necessary from a turret axis, thereby reducing the risk of collision.

At least one of said objects is achieved by a tool holder and a parting and grooving tool suitable for being mounted on an indexable turret having a plurality of tool stations, where adjacent tool stations having a predetermined angular spacing, the tool holder comprising: a mounting portion and a projected portion, wherein the mounting portion comprises a flat surface defining an interface plane, wherein the projected portion comprises a recess for holding the parting and grooving tool, wherein the projected portion and the mounting portion are connected to each other, wherein the parting and grooving tool comprises: a cutting portion and a clamping portion, wherein the cutting portion comprises a cutting edge, wherein the clamping portion comprises a rear end surface, wherein the parting and grooving tool is mountable in the recess such that a distance from the interface plane to the rear end surface of the parting and grooving tool is greater than a distance from the interface plane to the cutting portion of the parting and grooving tool.

By such a tool holder and a parting and grooving tool, the tool holder can be mounted to an adjacent tool station in relation to a tool station which is in an active position. A tool station which is in an active position is a tool station which is between a turret axis and a rotational axis of the metal work piece to be machined.

The tool holder, or tool block, is preferably in the form of a machine adapted clamping unit. The tool holder and the parting and grooving tool may be designated as a tool unit.

The tool holder holds the parting and grooving tool and connects it to a tool station.

The parting and grooving tool is a turning tool. The parting and grooving tool may be in the form of e.g. a parting and blade or a shank tool, and a parting and grooving insert.

The parting and grooving tool comprises a cutting portion, i.e. a cutting end or a free end, and a clamping portion, i.e. a clamping end or holding portion or holding end.

The cutting edge separates a rake face and a clearance surface.

The rake face preferably comprise chip breaking means in the form of one or more protrusions.

The cutting edge is spaced apart from all lines which are perpendicular to the interface plane and intersects the flat surface.

The cutting edge preferably is part of a parting and grooving insert.

The cutting edge preferably defines a width, which preferably is 1-15 mm, even more preferably 1.8-8.0 mm.

The parting and grooving tool is suitable for forming a groove in a metal work piece, were said groove has a width which is equal to a width of the cutting edge.

The mounting portion is a turret interface portion and may be designated a base portion. The mounting portion is suitable for connecting the tool holder to a tool station.

The projected portion is projecting or extending in a direction away from the mounting portion and away from the turret axis.

The projected portion and the mounting portion is permanently or detachably/releasably connected. If permanently connected, the projected portion and the mounting portion may form a singular body. If detachably/releasably connected, the projected portion and the mounting portion may be connected by connecting means, which may include one or more bolts, holes and/or threaded holes.

The flat surface is adapted for connection to a tool station of an indexable turret.

The interface between the tool station and the mounting portion can be in various configurations. For example, the mounting portion may be clamped to the tool station in accordance with what is shown and described in US 2017/0197252 A1, US 2014/0133903 A1 or US 2011/0023276 A1.

Said turret preferably comprises a front surface, an opposite rear surface and a peripheral surface connecting the front and rear surfaces.

The peripheral surface preferably comprises the tool stations. Alternatively, the front surface may comprise the tool stations.

Each tool station may preferably include a flat surface and an opening or a receiving bore. Each tool station may preferably comprise bolt holes. Said opening and/or bolt holes may radially penetrates through the flat surface and are preferably oriented perpendicular to the flat surface of the tool station.

The recess is a cavity or receiving seat for the parting and grooving tool. The recess may be a blade pocket. The parting and grooving tool can be inserted into the recess. The parting and grooving tool can be held or clamped in the recess, which may be achieved in various ways. For example, the tool holder may comprise a clamp (not shown) where the first or second side surface of the recess is part of said clamp. One or more screws or bolts can be used to press said clamp against the parting and grooving tool. The tool holder may comprise one or more threaded holes for said one or more screws or bolts. Such a solution is well known for holding a parting and grooving blade in a tool holder or a tool block, see e.g. U.S. Pat. No. 10,052,693 B2. For such a solution, the overhang of the parting and grooving tool can be adjusted within a range. The parting and grooving tool may be clamped in the recess in other ways, such as by means of one or more screws or bolts, a threaded hole in the bottom surface of the recess and a through hole extending between the first and second surfaces, such as shown in EP2730356A1. Alternatively, the parting and grooving tool can be held in the recess by an interference fit, i.e. a press fit, or a friction fit. In such a case, the first and second side surfaces of the recess may be inclined, and third and the fourth surfaces of the parting and grooving tool may be inclined.

The parting and grooving tool is mounted or mountable in the recess such that the clamping portion or clamping portion end is inside or at least partly inside the recess, and such that the cutting portion or cutting portion end is outside or at least partly outside the recess. At least a portion of the clamping portion is in contact with at least a portion of the recess.

A shortest distance from the interface plane to the rear end surface of the parting and grooving tool is greater than a shortest distance from the interface plane to the cutting portion of the parting and grooving tool.

A distance between the opening of the recess to the interface plane is shorter than a distance from the rear end surface of the recess to the interface plane, where the interface plane comprising the flat surface. Said distances are measured perpendicular to a parting and grooving tool axis, which is a longitudinal axis of the parting and grooving tool.

The parting and grooving tool is preferably elongated along the parting and grooving tool axis.

The cutting portion of the parting and grooving tool is preferably elongated along the parting and grooving axis. In other words, a distance from a top surface of the parting and grooving tool to the tool holder is greater than than a distance from a third surface, facing towards the metal work piece, to a fourth surface, opposite said third surface.

The parting and grooving tool axis is inclined by an angle in relation to the interface plane. Said angle is preferably equal to or substantially equal to the predetermined angular spacing of the adjacent tool stations of the indexable turret.

According to an embodiment, the parting and grooving tool is elongated along a grooving tool axis, wherein the parting and grooving tool axis is inclined by an angle in relation to the interface plane, wherein said angle is at least 1° and not more than 45°.

The grooving tool axis intersects the rear end surface and an opposite top surface. Preferably, the grooving tool axis is perpendicular to the rear end surface.

Said angle is preferably equal to or substantially equal to 360° divided by an integer. Said integer is preferably more than or equal to 8. Said integer is preferably less than or equal to 36. Said angle may preferably be 10°, 15°, 20°, 22.5°, 30° or 45°.

The parting and grooving tool axis extends equidistantly or substantially equidistantly between the opposite third and fourth surfaces. Said parting and grooving tool axis is parallel with the opposite third and fourth surfaces. The parting and grooving tool axis extends mid-way between the opposite first and second surfaces.

By such an embodiment, the above mentioned advantages of the invention are further improved.

According to an embodiment, the mounting portion comprises a hole pattern.

The tool holder is adapted for connection to a tool station formed on a peripheral surface of the turret.

Said hole pattern is a set of bolt holes for bolts.

Said hole pattern and said bolts are for connecting the tool holder to a tool station of an indexable turret.

Said tool holder is thus adapted for connection to a peripheral tool station which is a turret interface.

Said turret comprises a front surface, an opposite rear surface and a peripheral surface connecting the front and rear surfaces, wherein the peripheral surface comprises the tool stations.

Said tool holder is adapted for connecting to a tool station of a turret of a CNC-machine. Such tool station may various types of configuration with respect of e.g. bolt hole diameter, bolt hole thread type, size and shape of flat surface, spacing, position and number of bolt holes. The hole pattern of the mounting portion preferably correspond to or substantially corresponds to a hole pattern of a tool station of a turret. The hole pattern of mounting portion may correspond to a hole pattern the following turret interfaces from the following brands of CNC-machines: BT55A, BT65A, BT75A, BT85A from Doosan® or Hwacheon® or Hyundai Wia®; GM40V from Gildemeister®; MZ40V, MZ40X, MZ50V, MZ68A, MZ68B, MZ80A, MZ-F, MZ-A, MZ-B, MZ-C, MZ-D, MZ-E, MZ-F, MZ-G, MZ-H from Mazak®; MS40A, MS60A, MS75A, MS110A, MS-A, MS-B, MS-C from Mori Seiki®; NA55A, NA65A, NA75A from Nakamura®; OK55A, OK60A, OK60B, OK60C, OK-A, OK-B, OK-E, OK-F from Okumae; DO-A, DO-B, DO-C from Doosan®; MA-A, MA-B from Murata®. The hole pattern of mounting portion may further correspond to a hole pattern according to VDI also known as DIN 69880 or ISO 10889.

The mounting portion of the tool holder preferably comprises an external surface. The external surface and the flat surface are preferably facing opposite or substantially opposite directions. Said bolt holes are preferably through holes intersecting the flat surface and the external surface of the mounting portion.

Said bolt holes are preferably oriented perpendicular to the flat surface of the mounting portion.

The mounting portion may comprise a shaft or a pin or boss part. Said shaft is arranged to be inserted into opening or receiving bore of the tool station. A cross section area of said shaft is smaller than a cross section area of the flat surface, where said cross section areas are in or parallel to the interface plane.

Said shaft extends from the flat surface in the opposite direction or substantially opposite direction relative to the projecting portion.

Said shaft extends towards the rotational axis of the turret.

The tool station preferably is a peripheral tool station.

According to an embodiment, the parting and grooving tool comprises a parting and grooving blade and a parting and grooving insert,
- wherein the parting and grooving blade comprises an insert seat for the parting and grooving insert,
- wherein the parting and grooving blade comprises opposite first and second surfaces, opposite third and fourth surfaces and opposite top and rear surfaces,
- wherein a blade width is defined as a shortest distance between the first and second surfaces;
- wherein the parting and grooving insert comprises the cutting edge,
- wherein the cutting edge defines an insert width,
- wherein the parting and grooving insert comprises a rake face,
- wherein the insert width is greater than the blade width.

Using an exchangeable parting and grooving insert give economical advantages, because only the insert needs to be replaced normally.

The parting and grooving tool may preferably be in accordance with the embodiment shown in FIGS. 5-9 in EP 3357613 A1.

The top surface and the rake face are facing the same direction or substantially the same direction.

The rake face may preferably comprise chip breaking or chip forming means or a chip breaker, in the form of one or more depressions and/or protrusions.

A parting and grooving tool axis extends equidistantly or substantially equidistantly between the opposite third and fourth surfaces. Said parting and grooving tool axis is parallel with the opposite third and fourth surfaces. The parting and grooving tool axis extends mid-way between the opposite first and second surfaces.

Preferably, the opposite third and fourth surfaces are V-shaped in a cross section, where said cross section is in a plane perpendicular to the parting and grooving tool axis.

The parting and grooving tool may comprise more than one insert seat. For example, a further insert seat may be formed diagonally in relation to the above defined insert seat.

The parting and grooving tool is preferably elongated along a parting and grooving tool axis. In other words, a distance between opposite top and rear surfaces is greater, preferably 3-8 times greater than a distance between the opposite third and fourth surfaces.

A distance between opposite top and rear surfaces is greater, preferably 15-150 times greater than a distance between the opposite first and second surfaces.

The parting and grooving tool axis is inclined by an angle in relation to the interface plane.

According to an embodiment, the tool holder comprises positioning means, wherein said positioning means comprises a stop surface for being in contact with the rear surface of the parting and grooving tool, wherein the stop surface is moveable along or parallel to a parting and grooving tool axis.

Thereby the position or height of the cutting edge can be adjusted. The inventors have found that the position or height of the cutting edge can affect tool life and/or chip breaking, and that exact position or height set by positioning means can compensate for manufacturing tolerances for the parting and grooving tool.

Said positioning means, i.e. a positioning mechanism, may comprise an adjustment screw for a stop member, wherein said stop member comprises a stop surface acting as a contact surface for the rear surface of the parting and grooving tool.

Said positioning means allow accurate tool setup and repeatable replacement when removing and reinstalling a parting blade in the recess.

According to an embodiment, the recess comprises a rear end surface and an opposite opening, a first side surface, a second side surface and a bottom surface,
- wherein a portion of the third surface of the parting and grooving tool is in contact with a portion of the second side surface of the recess,
- wherein a portion of the fourth surface is in contact with a portion of the first side surface of the recess.

According to an embodiment, the recess is offset in relation to the flat surface of the mounting portion.

Thereby the accessability is improved because there is less risk that the turret is interfering with the metal work piece.

The recess is offset in relation to the flat surface of the mounting portion means that the recess is spaced apart from all lines which is perpendicular to and intersect the flat surface of the mounting portion.

Formulated differently, in a rear view, where the flat surface of the mounting portion is facing the viewer, the recess is spaced apart from the flat surface of the mounting portion.

According to an embodiment, a tool post for a lathe is provided, comprising a tool holder and a parting and grooving tool as described above, and a turret,
- wherein the turret is rotatable around a turret axis,
- wherein the turret comprises a plurality of tool stations,
- wherein adjacent tool stations are spaced apart by a predetermined angle,
- wherein the mounting portion of the tool holder is detachably releasably connected to a tool station of the turret,
- wherein the cutting edge intersects a plane comprising an adjacent tool station and the turret axis.

The turret or revolver is a rotatable or indexable turret for a lathe which functions as a tool support, and preferably include 4-16 tool stations or holder attaching surfaces or turret positions, even more preferably 6-12 tool stations. In this context, the number of tool stations is for one revolutions. The turret may comprise more than one set of tool stations. The tool stations are preferably peripheral tool stations. The turret preferably forms a polygonal shape or substantially a polygonal shape in a side view, where the turret axis is towards the viewer. Said polygonal shape preferably comprise 4-16 corners, even more preferably 6-12 corners. The turret is indexable around the turret axis, such that any tool station can be positioned in an active position, i.e. facing a metal work piece to be machined.

Said predetermined angular spacing a is preferably equal to 360° divided by the number of tool stations. Said predetermined angular spacing a is preferably 22.5°, 30°, 45°, 60° or 90°. Said predetermined angular spacing a is preferably 21°-90°.

Each tool station functions as a mounting surface or a mounting seat for the tool holder, more specifically for the mounting portion of the tool holder. Each tool station preferably comprise a flat surface. Said flat surface is preferably formed on an outer peripheral surface of the turret. The interface plane comprises said flat surface. Said flat surface is preferably rectangular shaped or square shaped. The flat surface of the mounting portion is in contact with and co-planar with the flat surface of a tool station. Each tool station preferably includes an opening or a receiving bore or insertion hole. Preferably, said opening is centrally positioned in or on the tool station.

Each tool station 4 preferably comprise a hole pattern, or a set of bolt holes. Said hole pattern preferably correspond to a hole pattern of the mounting portion, and preferably comprise 2-8 bolt holes, even more preferably four bolt holes. Each of said bolt holes preferably comprise an internal thread. Said opening and/or bolt holes radially penetrates through the flat surface and are preferably oriented perpendicular to the flat surface of the tool station.

One tool station, adjacent to the tool station to which said tool holder is connected, is preferably empty. In other words, no cutting edge is connected to said tool post.

According to an embodiment, the predetermined angle separating adjacent tool stations is equal to or substantially equal to an angle, where a parting and grooving tool axis is inclined by said angle in relation to the interface plane.

Thereby, a tangential cutting force is parallel to or substantially parallel to the parting and grooving tool axis, which give a reduced risk for vibrations.

Substantially equal should be understood as +/−20°, even more preferably +/−10°.

In other words, the parting and grooving tool axis is parallel to or substantially parallel to a plane comprising the adjacent tool station.

According to an embodiment, the cutting edge intersects or substantially intersects a plane comprising a center point of the adjacent tool station and the turret axis.

Thereby, the tool life is increased.

The tool holder is preferably spaced apart from said plane. "Substantially intersects" means that the cutting edge is within +/−0.5 mm from said plane.

According to an embodiment, the turret comprises a front surface, an opposite rear surface and a peripheral surface connecting the front and rear surfaces, wherein the peripheral surface comprises the tool stations.

The peripheral surface is an outer circumference or an outer casing. The tool stations are peripheral tool stations.

According to an embodiment, the turret comprises a front surface, an opposite rear surface and a peripheral surface connecting the front and rear surfaces, wherein the cutting edge is outside a volume limited by a plane comprising the front surface and a plane comprising the rear surface.

The cutting edge is thus outside, or spaced apart from, or off-set, in relation to the peripheral surface.

According to an embodiment, the projected portion is spaced apart from a volume limited by a plane comprising the front surface and a plane comprising the rear surface.

The projected portion is spaced apart from or outside a volume limited by a plane comprising the front surface and a plane comprising the rear surface.

Thereby, the accessability is improved. In other words, the risk of collision between the turret and the metal work piece is reduced.

According to an embodiment, the tool post comprises coolant delivery means,
  wherein said coolant delivery means is connected to a coolant outlet associated with the adjacent tool post,
  wherein said coolant delivery means is connected to the tool holder or the parting and grooving tool.

Thereby the tool life and/or chip breaking is improved.

Said coolant delivery means may include a tube or a pipe. Said coolant delivery means is adapted to deliver coolant from a coolant outlet associated to the adjacent tool post, i.e. a tool post adjacent to the tool post to which the tool holder is connected. The coolant outlat may be formed in the tool station. Alternatively, the coolant outlet may be formed in the front surface of the turret, adjacent to the adjacent tool station. The coolant delivery means may be connected to the tool holder, e.g. to a coolant inlet formed in a side surface of the tool holder. In such a case, the tool holder comprises a internal coolant channel. Alternatively, the coolant delivery means is connected to the first or second surface of the parting and grooving tool. Preferably, the parting and grooving tool comprises an internal coolant channel, adapted to direct coolant towards the cutting edge.

According to an embodiment, a method for cutting a groove in a metal work piece is provided, comprising the steps of:
  providing an above described tool post, wherein the tool holder is connected to one tool station,
  rotating the metal work piece around a rotational axis thereof,
  setting the turret axis parallel to the rotational axis of the metal work piece,
  setting the cutting edge between the turret axis and the rotational axis of the metal work piece,
  moving the turret axis along a straight line in a feed direction towards the rotational axis of the metal work piece such that the cutting edge is moved towards the rotational axis of the metal work piece and such that a groove is formed in the metal work piece.

The tool body is connected to one tool station. The rotating or indexing of the turret is to a position where the cutting edge is between or substantially between, i.e. within +/−2 mm, even more preferably +/−1 mm, the turret axis and the rotational axis of the metal work piece.

The tool station to which the cutting edge is connected, by means of the tool holder, is spaced apart from a straight line connecting the turret axis and the rotational axis.

The tool post is part of a CNC-lathe, having an X axis and preferably an Y-axis. The turret is rotatable around a Z-axis. In other words, the turret axis is the Z-axis. The feed direction is preferably in the X-axis.

According to an embodiment, there is provided a computer implemented method for setting a pair-wise connection between a cutting edge and a first tool station, the method comprising the step of: sending, from a client to a numerical control system, an activation signal wherein the activation signal is adapted to associate properties of a cutting edge connected to a second tool station with the first tool station, wherein the second tool station is adjacent to the first tool station.

The method is thus for electronically link or associate one specific cutting edge to one specific tool station of a turret.

The method comprising the step of: sending, from a client to a numerical control (NC) system, an activation signal. The client may be an operator, i.e. a human. Alternatively, the client may be a computer or a computer system, such as a computer or computer system connected to or part of a tool presetter.

The activation signal is adapted to associate or connect properties of a cutting edge connected to a second tool station with an adjacent first tool station. The activation signal thus comprises an instruction for the numerical control system to link the cutting edge and an a tool station.

The computer-implemented method is for a controlling a CNC-lathe comprising a tool post.

The cutting edge is preferably a cutting edge of a parting and grooving insert. The cutting edge preferably extends parallel to or substantially parallel to a rotational axis of the turret.

The properties for the cutting edge may include one or more of: cutting edge width, corner radius, cutting data recommendations and usage time. Said properties may also include properties for the tool holder to which the parting and grooving tool is connected.

The adjacent i.e. second tool station is preferably counter-clockwise in relation to the tool station, i.e. the first tool station, to which the tool holder is connected, when the front surface of the turret is facing the viewer.

According to an embodiment, there is provided computer-implemented method for controlling a CNC-lathe comprising a tool post, the method comprising the steps of:
receiving an activation signal from a sender, wherein the activation signal comprises an instruction to use a selected parting and grooving tool for a metal cutting operation of a metal work piece, and
sending an activation signal to the CNC-lathe, wherein the activation signal is adapted to rotate the turret such that the tool station to which the selected parting and grooving tool is connected is positioned adjacent to a tool station in an active position.

The sender may be, or connected to, a human-machine user interface. The sender may be a computer program, e.g. a numerical code, controlling a machining sequence. In other words, the numerical code include an activation signal. The activation signal received comprises an instruction to use, prepare, or activate a selected parting and grooving tool or a cutting edge for a subsequent metal cutting operation of a metal work piece.

The selected parting and grooving tool is mounted to any of the above described tool holders. The parting and grooving tool is according to any of the above described parting and grooving tools.

The tool post is preferably according to the tool post according to any of the above described tool posts.

A tool post is a turret comprising a plurality of tool stations,
wherein a parting and grooving tool is connected to a tool station, preferably by means of a tool holder. Said parting and grooving tool, tool holder and turret are preferably according to any of the above described embodiments.

Preferably, the method comprises the further steps of:
moving the turret in a direction towards the tool station feed direction F, which is along the X-axis direction.

Preferably, the method comprises the step of controlling a coolant supply such that coolant is supplied to the tool station to which said tool holder is connected.

The adjacent tool station is preferably counter-clock-wise in relation to the tool station to which the tool holder is connected, when the front surface of the turret is facing the viewer.

A tool station which is in an active position is a tool station which is between and preferably perpendicular to a turret axis and a rotational axis of the metal work piece to be machined.

According to an embodiment, a computer program product has instructions which when executed by a CNC-lathe cause the CNC-lathe to perform the steps of the above described computer-implemented method.

In other words, the computer program product cause the CNC-lathe to rotate the turret such that the tool station to which the parting and grooving tool is connected is positioned adjacent to a tool station in an active position.

Preferably, the computer program product comprises the further instruction to cause the CNC-lathe to move the turret in a direction towards the tool station feed direction F, which is in the X-axis direction Said computer program product may e.g. be in the form of a computer readable medium or a data stream which is representative of said computer program product.

DESCRIPTION OF THE DRAWINGS

The present invention will now be explained in more detail by a description of embodiments of the invention and by reference to the accompanying drawings.

DETAILED DESCRIPTION OF EMBODIMENTS OF THE INVENTION

Figure 1:
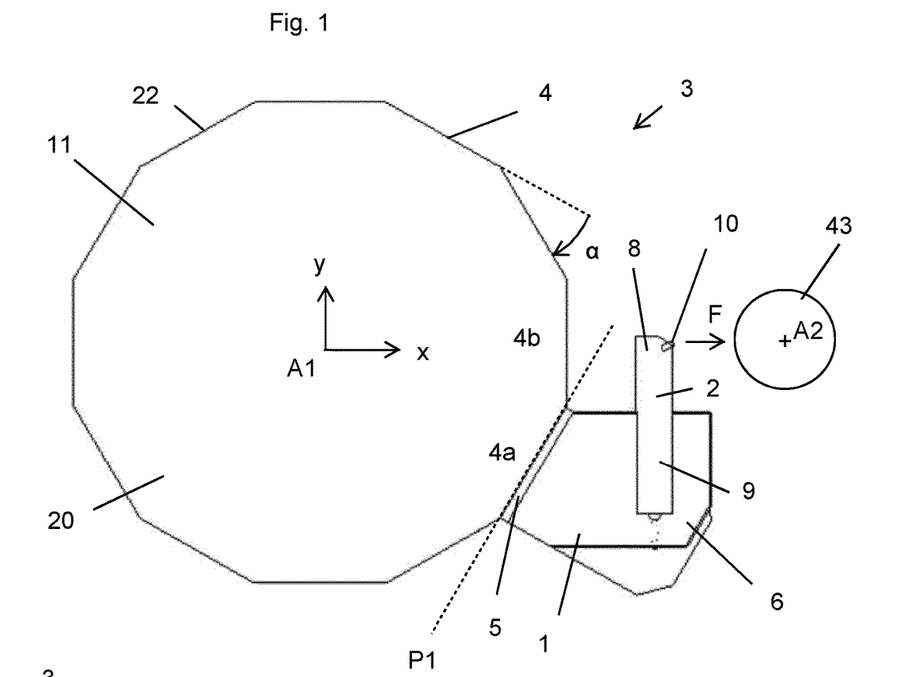
FIG. 1 is a side view of a turret and a tool holder and a parting and grooving tool according to a first embodiment
Figure 2:
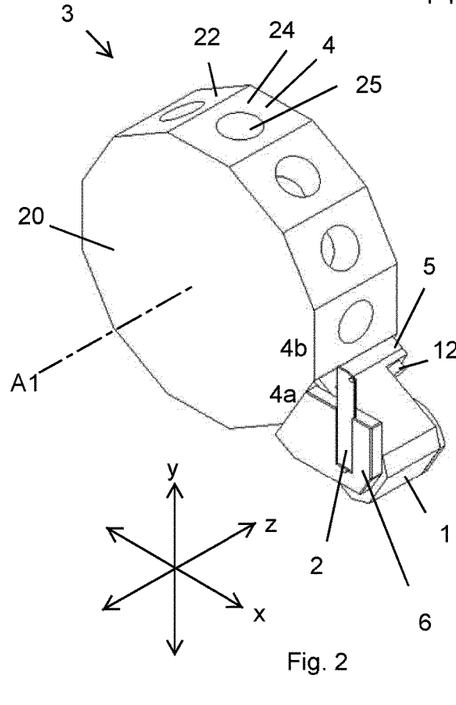
FIG. 2 is a perspective view of the turret and a tool holder and a parting and grooving tool in FIG. 1
Figure 3:
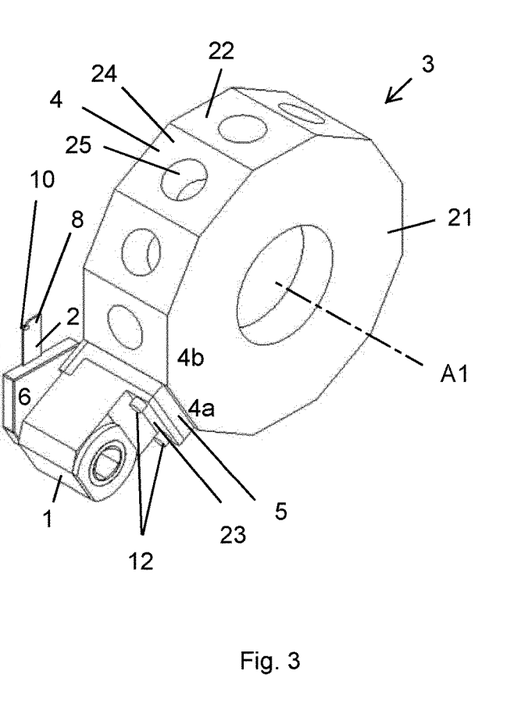
FIG. 3 is a further perspective view of the turret and a tool holder and a parting and grooving tool in FIG. 1

Reference is made to FIGS. 1-3 which show tool post 3 for a CNC-lathe (not shown), comprising a tool holder 1 according to a first embodiment, a parting and grooving tool 2, and a turret 11. The turret 11 is rotatable around a turret axis A1. The turret 11 comprises a front surface 20, an opposite rear surface 21 and a peripheral surface 22 connecting the front and rear surfaces 20, 21. The turret 11 comprises a plurality of tool stations 4. Each tool station 4 comprises a flat surface 24, an opening 25, and a hole pattern (not shown). The tool stations are formed on the peripheral surface 22. The flat surfaces 24 of adjacent tool stations 4a, 4b are spaced apart by a predetermined angle α.

The tool holder 1 comprising a mounting portion 5 and a projected portion 6, projecting away from the turret axis A1. The mounting portion 5 comprises a flat surface 7 extending in an interface plane P1. The mounting portion 5 of the tool holder 1 is detachably connected to a tool station 4a. The adjacent tool station 4b is empty, i.e. no cutting tool is connected to the adjacent tool station 4b.

A metal work piece 43 is rotatable around a rotational axis A2, which is parallel to the turret axis A1.

The flat surface 24 of the tool station 4a to which the mounting portion 5 of the tool holder 1 is connected extends in said interface plane P1. The flat surface 24 of said tool station 4a is in contact with the flat surface 7 of the tool holder 1.

The projected portion 6 comprises a recess 13 for holding the parting and grooving tool 2.

The parting and grooving tool 2 is elongated and comprises a cutting portion 8, or a free end portion, and a clamping portion 9. The clamping portion 9 is inside the recess 13.

The parting and grooving tool 2 comprises a parting and grooving blade and a parting and grooving insert.

The cutting portion 9 comprises the parting and grooving insert. The parting and grooving insert comprises a cutting edge 10.

The cutting edge 10 is between the turret axis A1 and the rotational axis A2 of the metal work piece 43.

A longitudinal axis of the parting and grooving tool 2 is extending substantially parallel to a flat surface 24 of an adjacent station 4b to the tool station to which the mounting portion 5 of the tool holder 1 is connected.

As can be seen in FIGS. 2 and 3, the cutting edge 10 and at least a portion of the projected portion 6 are outside a volume limited by a plane comprising the front surface 20 and a plane comprising the rear surface 21.

The CNC-lathe, more specifically the turret 11 is moveable in or around two, preferably three axis. Said axis are designated X, Y and Z, and are orthogonal. The turret 11 is rotatable around the Z axis, which is the turret axis A1. The turret can be set such that the X-axis intersects turret axis A1 and the rotational axis A2 of the metal work piece 43.

Cutting a groove in the metal work piece 43 is achieved by first rotating the tool post 3 including the turret 11 around the turret axis A1 such that a flat surface 24 of one tool station 4b is perpendicular to a shortest line between the turret axis A1 and the rotational axis A2, and such that the tool holder 1 is connected to an adjacent station 4a to the first mentioned tool station 4b. Secondly, the tool post 3 including the turret 11 is moved in a straight line in a feed direction F towards the rotational axis A2 such that a groove is formed in a metal work piece 43. The cutting edge 11 is active, i.e. cuts chips from the metal work piece 43. A groove can be formed which precedes a parting off operation, i.e. a piece of the metal work piece 43 is separated. The feed direction F is along the X-axis. The rotation of the metal work piece 43 is counter clock-wise in FIG. 1.

As seen in e.g. FIG. 1, the adjacent tool station 4b, which is in an active position, is counter-clock-wise in relation to the tool station 4a to which the tool holder 1 is connected, when the front surface of the turret 11 is facing the viewer.

Figure 4:
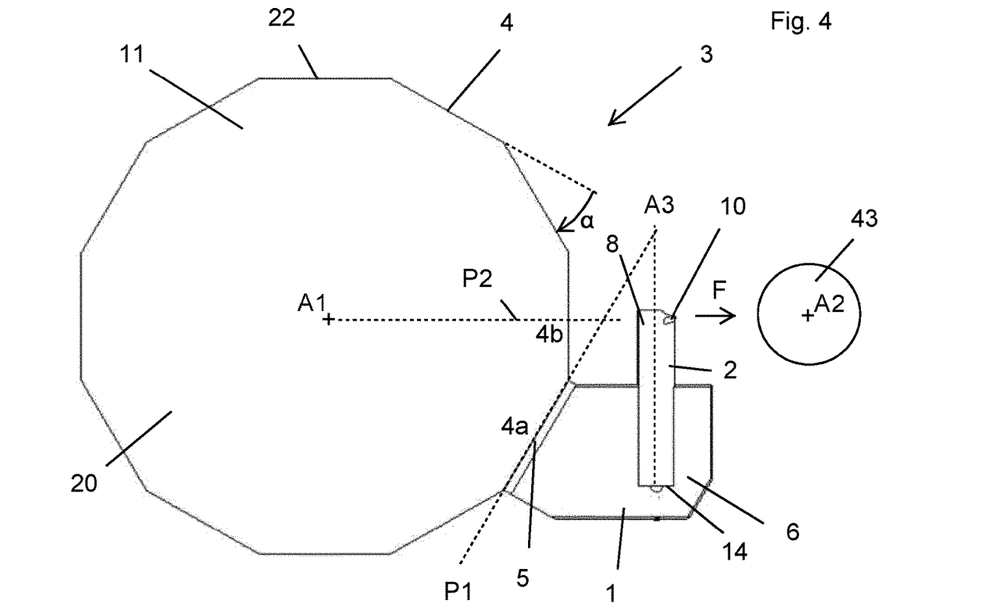
FIG. 4 is a side view of a turret and a tool holder and a parting and grooving tool according to a second embodiment and metal work piece
Figures 5, 6:
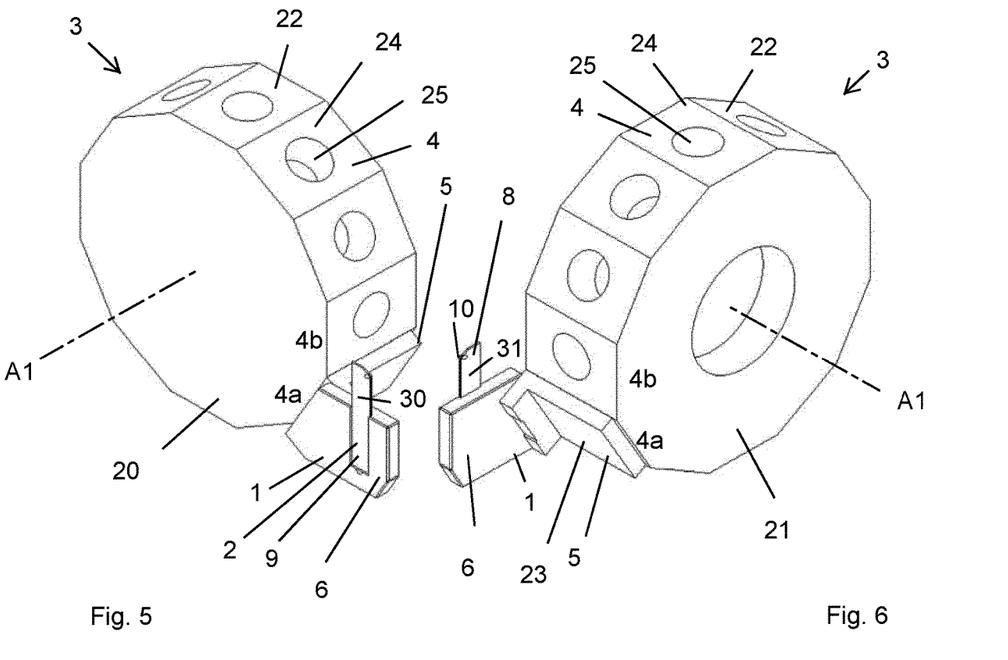
FIG. 5 is a perspective view of the turret and the tool holder and the parting and grooving tool in FIG. 4
FIG. 6 is a further perspective view of the turret and the tool holder and the parting and grooving tool in FIG. 4

Reference is now made to FIGS. 4-6 which show tool post 3, comprising a cutting tool 1 according to a second embodiment, a parting and grooving tool 2, and a turret 11. The parting and grooving tool 2 and the turret 11 is in accordance with the tool post 3 shown in FIGS. 1-3. The only difference compared to FIGS. 1-3 is the shape of the tool holder 1. The tool holder 1 is connected to a tool station 4a. As can be seen in FIG. 4, the cutting edge 10 intersects or substantially intersects a plane P2 comprising an adjacent tool station 4b and the turret axis A1. More specifically, the cutting edge 10 intersects or substantially intersects a plane P2 comprising the turret axis A1 and rotational axis A2 of the metal work piece 43. A parting and grooving tool axis A3 is inclined in relation to the interface plane P1. The parting and grooving tool 2 is elongated along the parting and grooving tool axis A3.

Figure 7:
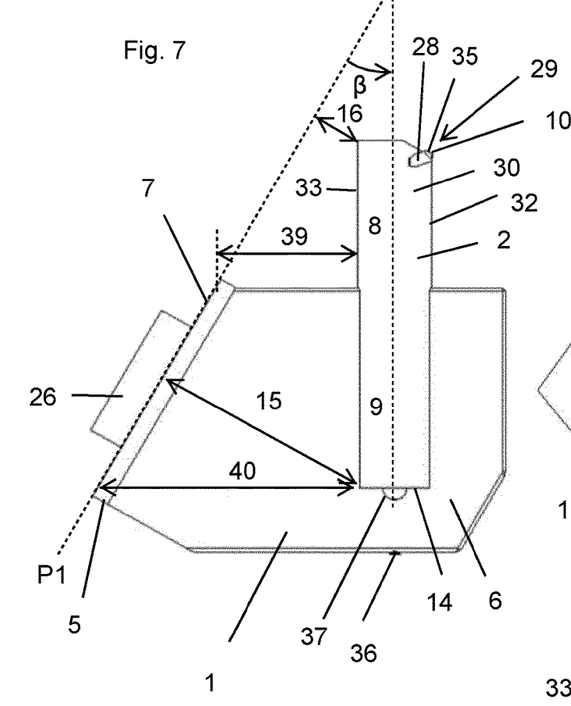
FIG. 7 is a side view of the tool holder and the parting and grooving tool according in FIG. 4
Figure 8:
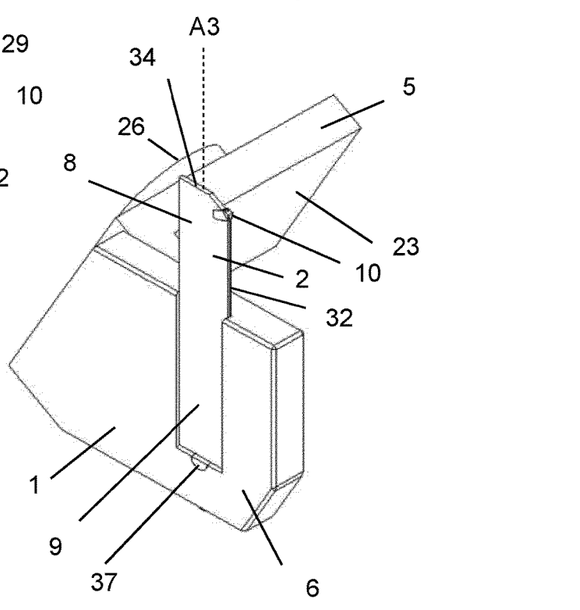
FIG. 8 is a perspective view of the tool holder and the parting and grooving tool in FIG. 7
Figure 9:
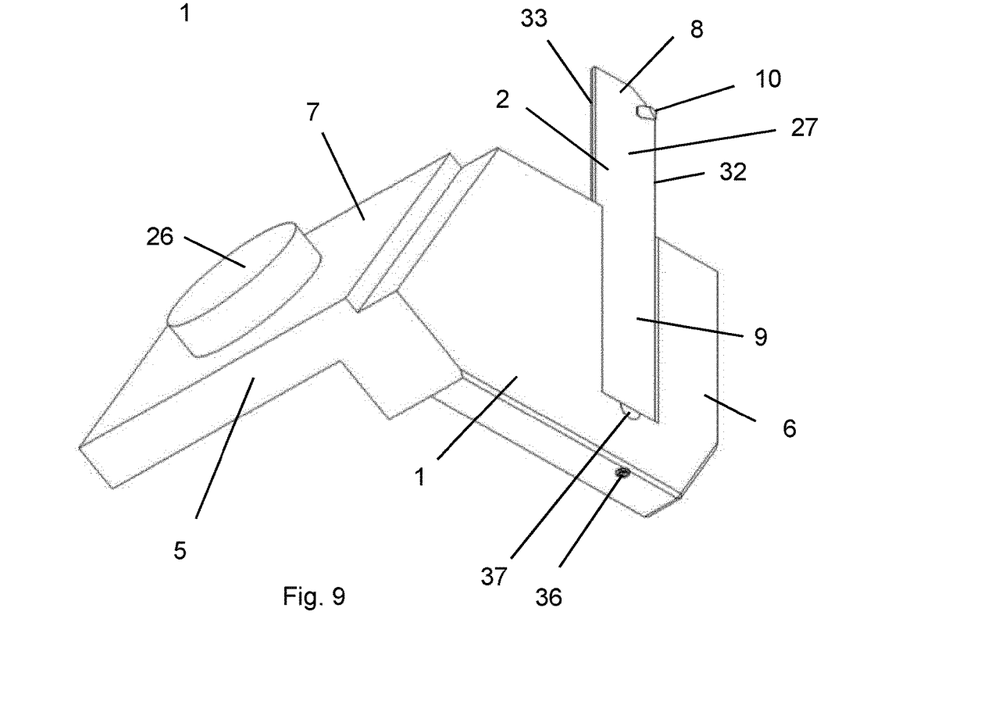
FIG. 9 is a further perspective view of the tool holder and the parting and grooving tool in FIG. 7

Reference is now made to FIGS. 7-9 which show the cutting tool 1 according to the second embodiment and the parting and grooving tool 2 shown in FIGS. 1-6. The parting and grooving tool 2 comprises a parting and grooving blade 27 and a parting and grooving insert 28. The parting and grooving blade 27 comprises an insert seat 29 for the parting and grooving insert 28. The parting and grooving blade 27 comprises opposite first and second surfaces 30, 31, opposite third and fourth surfaces 32, 33 and opposite top and rear surfaces 34, 14. The first and second surfaces 30, 31 are side surfaces. During cutting, the third surface 32 is facing towards the rotational axis A2. The parting and grooving insert 28 comprises a cutting edge 10 and a rake face 35, The top surface 34 of the parting and grooving blade 27 and the rake face 35 are facing the same direction or substantially the same direction.

A parting and grooving tool axis A3 extends parallel to and equidistantly or substantially equidistantly between the opposite third and fourth surfaces 32, 33. The third and fourth surfaces 32, 33 are clamping surfaces. The parting and grooving tool axis A3 extends mid-way between the opposite first and second surfaces 30, 31.

The opposite third and fourth surfaces 32, 33 are V-shaped in a cross section, where said cross section is in a plane perpendicular to the parting and grooving tool axis A3.

The parting and grooving tool 2 is elongated along a parting and grooving tool axis A3. Thus, a distance between opposite top and rear surfaces 34, 14 is greater than a distance between the opposite third and fourth surfaces 32, 33.

As can be seen in FIG. 7, the parting and grooving tool axis A3 is inclined by an angle β in relation to the interface plane P1. A distance 15 from the interface plane P1 to the rear end surface 14 of the parting and grooving tool 2 is greater than a distance 16 from the interface plane P1 to the cutting portion 8 of the parting and grooving tool 2.

The mounting portion 5 of the tool holder 1 comprises a flat surface 7 and an external surface 23. The external surface 23 and the flat surface 7 are facing opposite or substantially opposite directions. Through holes in the form of bolt holes (not shown) intersects the flat surface 7 and the external surface 23 of the mounting portion 5. The mounting portion 5 further comprise a shaft 26.

Figures 10, 11:
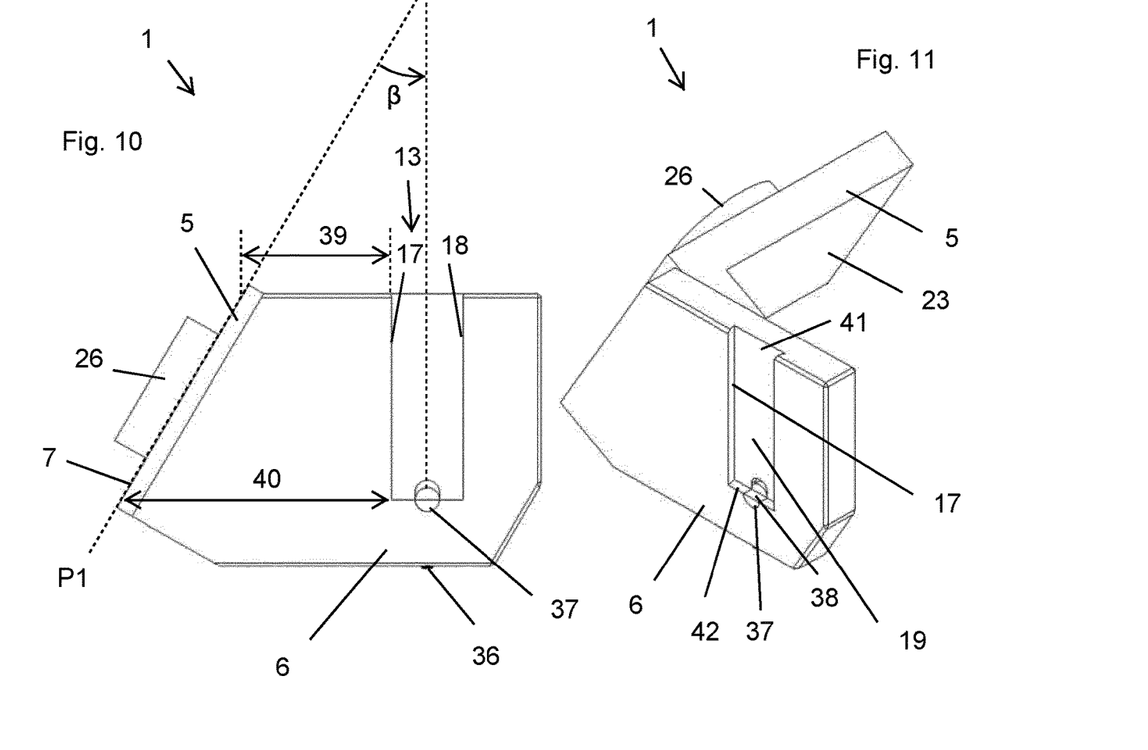
FIG. 10 is a side view of the tool holder in FIG. 7
FIG. 11 is a perspective view of the tool holder in FIG. 7
Figure 12:
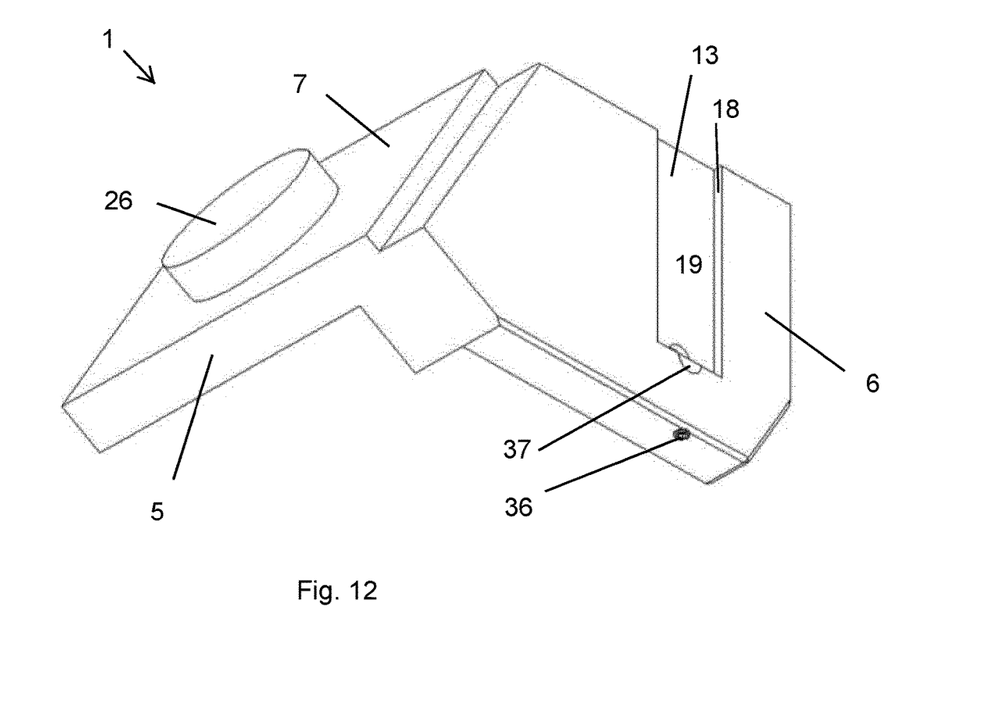
FIG. 12 is a further perspective view of the tool holder in FIG. 7

Reference is now made to FIGS. 10-12 which show the tool holder 1 as previously described according to the second embodiment.

The recess 13 comprises first and second side surface 17, 18, a bottom surface 19 and a rear end surface 42. An opening 41 of the recess 13 is opposite the rear end surface 42. The first and second side surfaces 17, 18 of the recess 13 are inclined. In other words, an angle between the bottom surface 19 and the first and second side surface 17, 18, respectively, is acute.

As can be seen in FIG. 10, a shortest distance 39 between the opening 41 of the recess 13 to the interface plane P1 is shorter than a shortest distance 40 from the rear end surface 42 of the recess 13 to the interface plane P1, where the interface plane P1 comprising the flat surface 7. The recess 13, more specifically a line parallel to and mid-way between the first and second side surfaces 17, 18, is inclined in relation to the interface plane P1 by an angle β. Said angle β is preferably 22.5°, 30°, 45°, 60° or 90°. Said angle β is preferably 21°-90°.

The tool holder 1 comprises positioning means 36, 37, i.e. a positioning mechanism, which comprise an adjustment screw 36 for a stop member 37. Said stop member 37 comprises a stop surface 38. Said stop member 37 intersect the rear end surface 42 and the bottom surface 19 of the recess 13. The distance between the opening 41 and the stop surface 38 is adjustable by means of the adjustment screw 36.

The mounting portion 5 comprises a hole pattern, i.e. a set of bolt holes (not shown).

The recess 13 is offset in relation to the flat surface 7 of the mounting portion 5.

Figure 13:
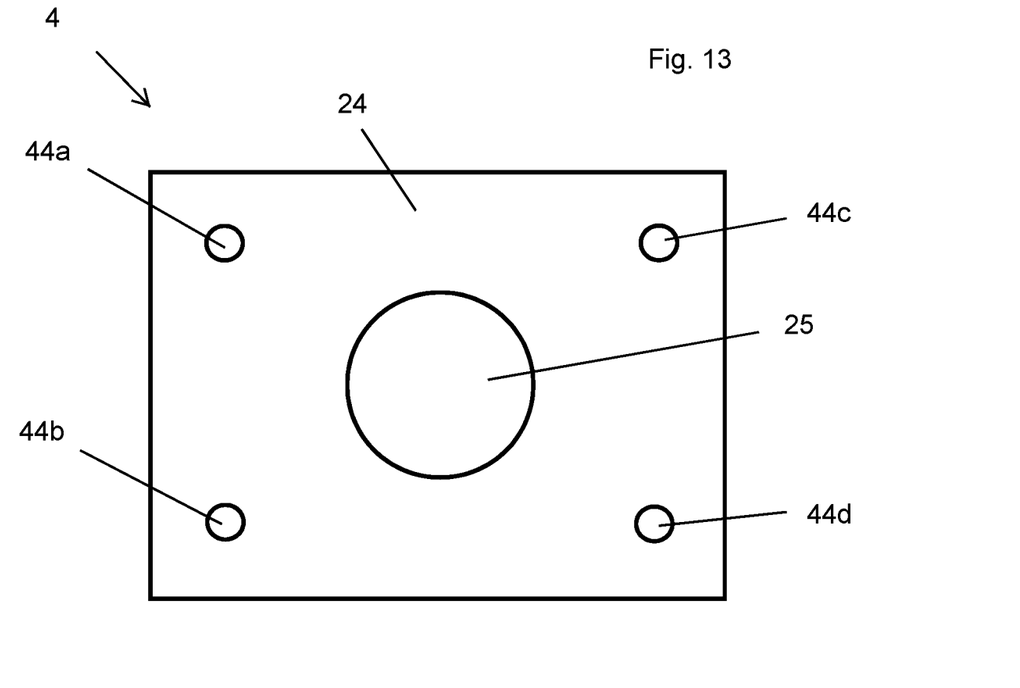
FIG. 13 is a top view of a tool station

Reference is now made to FIG. 13 which show a tool station 4 in a top view. The tool stations 4, 4a, 4b in FIGS. 1-6 may preferably be in accordance with the tool station 4 in FIG. 13. The tool station 4 comprises a flat surface 24, an opening 25, and a hole pattern 44ad, i.e. a set of bolt holes 44a-d. Said opening 25 and bolt holes 44ad are oriented perpendicular to the flat surface 24. Each of said bolt holes 44a-d comprises an internal thread (not shown), corresponding to an external thread of a bolt used for clamping a tool holder to the tool station.

Figure 14:
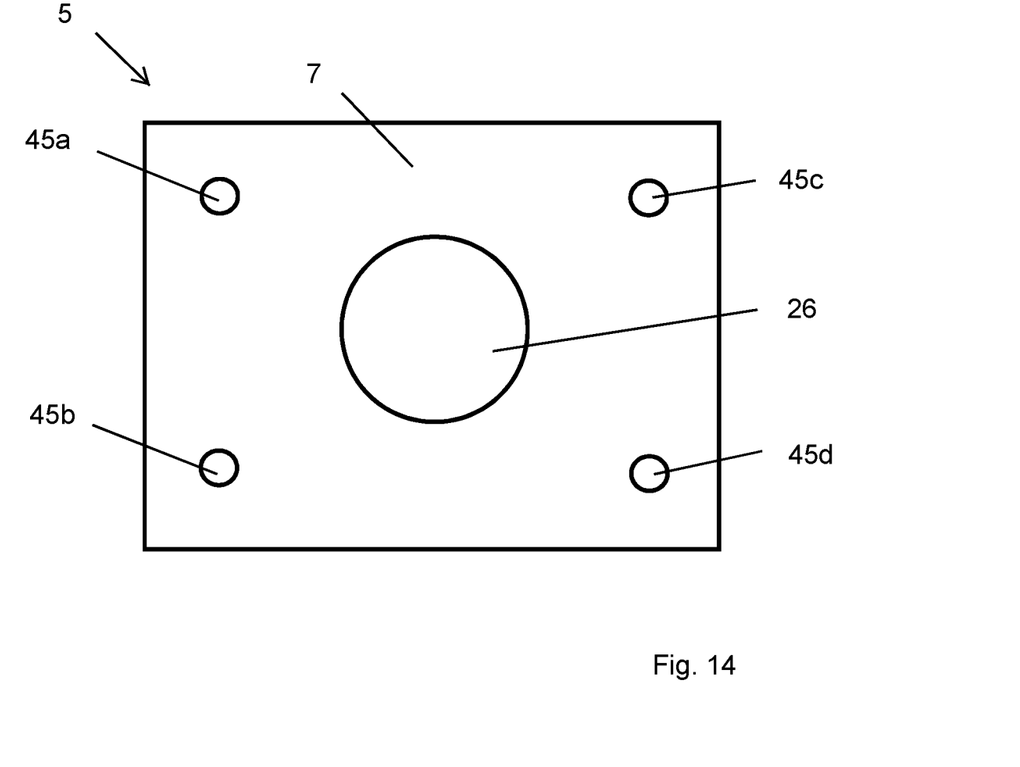
FIG. 14 is a rear view of a mounting portion of a tool holder

Reference is now made to FIG. 14 which show a mounting portion 5 of a tool holder 1 in a rear view. The above described tool holders may preferably comprise a mounting portion in accordance with the mounting portion 5 in FIG. 14. The mounting portion 5 comprises a hole pattern 45a-d, i.e. a set of bolt holes 45a-d for bolts (not shown). Said bolt holes 45a-d are through holes intersecting the flat surface 7 and are oriented perpendicular to the flat surface 7. The mounting portion 5 comprise a shaft 26 or a pin or boss part, oriented perpendicular to the flat surface 7. The mounting portion 5 comprise a shaft 26 or a pin or boss part or a protrusion, arranged to be inserted into the opening 25 of the tool station 4 seen in FIG. 13. During mounting, the flat surface 7 is in contact with the flat surface of the tool station.

The invention claimed is:

1. A tool holder and a parting and grooving tool arranged for being mounted on an indexable turret having a plurality of tool stations, wherein adjacent tool stations having a predetermined angular spacing, and wherein the turret is movable in a direction towards the tool station, which is along the X axis direction, the tool holder comprising
    a mounting portion, and
    a projected portion, wherein the mounting portion includes a flat surface defining an interface plane, wherein the projected portion includes a recess for holding the parting and grooving tool, wherein the projected portion and the mounting portion are connected to each other; and the parting and grooving tool comprising
    a parting and grooving blade, the blade including a cutting portion, and
    a clamping portion, wherein the cutting portion includes a parting and grooving insert having a cutting edge and a rake face, wherein the clamping portion includes a top and a rear end surface, wherein the parting and grooving tool is mountable in the recess such that a distance from the interface plane to the rear end surface of the parting and grooving tool is greater than a distance from the interface plane to the cutting portion of the parting and grooving tool, wherein the parting and grooving tool is elongated along a grooving tool axis, which is in a cutting direction along the Y axis direction, and wherein the top surface of the blade and the rake face are facing in a same or substantially same direction.

2. The tool holder and parting and grooving tool according to claim 1, wherein the parting and grooving tool axis is inclined by an angle in relation to the interface plane, wherein said angle is at least 1° and not more than 45°.

3. The tool holder and parting and grooving tool according to claim 1, wherein the mounting portion includes a hole pattern.

4. The tool holder and parting and grooving tool according to claim 1, wherein the parting and grooving tool an insert seat for receiving the parting and grooving insert, wherein the parting and grooving blade includes opposite first and second surfaces, and opposite third and fourth surfaces, wherein a blade width is defined as a shortest distance between the first and second surfaces, wherein the cutting edge defines an insert width, and wherein the insert width is greater than the blade width.

5. The tool holder and parting and grooving tool according to claim 4, wherein the recess includes a rear end surface and an opposite opening, a first side surface, a second side surface and a bottom surface, wherein a portion of the third surface of the parting and grooving tool is in contact with a portion of the second side surface of the recess, and wherein a portion of the fourth surface is in contact with a portion of the first side surface of the recess.

6. The tool holder and parting and grooving tool according to claim 1, wherein the tool holder includes positioning means, wherein said positioning means include a stop surface arranged for being in contact with the rear surface of the parting and grooving tool, and wherein the stop surface is moveable along or parallel to a parting and grooving tool axis.

7. The tool holder and parting and grooving tool according to claim 1, wherein the recess is offset in relation to the flat surface of the mounting portion.

8. A tool post for a lathe, the tool post comprising:
    a tool holder and a parting and grooving tool according to claim 1; and
    a turret, wherein the turret is rotatable around a turret axis, wherein the turret includes a plurality of tool stations, wherein adjacent tool stations are spaced apart by a predetermined angle, wherein the mounting portion of the tool holder is detachably connected to a tool station of the turret, and wherein the cutting edge intersects a plane including an adjacent tool station and the turret axis.

9. The tool post according to claim 8, wherein the predetermined angle separating adjacent tool stations is equal to or substantially equal to an angle, and wherein a parting and grooving tool axis is inclined by said angle in relation to the interface plane.

10. The tool post according to claim 8, wherein the cutting edge intersects or substantially intersects a plane including a center point of the adjacent tool station and the turret axis.

11. The tool post according to claim 8, wherein the turret includes a front surface, an opposite rear surface and a peripheral surface connecting the front and rear surfaces, wherein the peripheral surface includes the tool stations.

12. The tool post according to claim 11, wherein the projected portion is outside a volume limited by a plane having the front surface and a plane having the rear surface.

13. The tool post according to claim 8, wherein the turret includes a front surface, an opposite rear surface and a peripheral surface connecting the front and rear surfaces, and wherein the cutting edge is outside a volume limited by a plane having the front surface and a plane having the rear surface.

14. The tool post according to claim 8, further comprising coolant delivery means, wherein said coolant delivery means is connected to a coolant outlet associated with the adjacent tool station, and wherein said coolant delivery means is connected to the tool holder or the parting and grooving tool.

15. A method for cutting a groove in a metal work piece, comprising the steps of:
    providing a tool post according to claim 8, wherein the tool holder is connected to one tool station;

rotating the metal work piece around a rotational axis thereof;

setting the turret axis parallel to the rotational axis of the metal work piece;

setting the cutting edge between the turret axis and the rotational axis of the metal work piece; and moving the tool post including the turret axis along a straight line in a feed direction towards the rotational axis of the metal work piece such that the cutting edge is moved towards the rotational axis of the metal work piece and such that a groove is formed in the metal work piece, wherein the turret is movable in a direction towards the tool station, which is along the X axis, the turret axis being the Z axis.

16. The method according to claim 15, wherein the cutting edge intersects or substantially intersects the plane including the turret axis and the rotational axis of the metal work piece.

* * * * *